(12) United States Patent
Canapathy

(10) Patent No.: US 10,417,306 B1
(45) Date of Patent: Sep. 17, 2019

(54) DETERMINING LOAD COMPLETION OF DYNAMICALLY UPDATED CONTENT

(71) Applicant: Amazon Technologies, Inc., Reno, NV (US)

(72) Inventor: Subash Chandran Canapathy, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 563 days.

(21) Appl. No.: 13/733,658

(22) Filed: Jan. 3, 2013

(51) Int. Cl.
*G06F 17/21* (2006.01)

(52) U.S. Cl.
CPC .................... *G06F 17/21* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,736,185 A * | 4/1988 | Matsumoto | ............... | G01D 7/00 340/450 |
| 8,023,137 B2 * | 9/2011 | Yasui | .................. | H04L 41/0213 358/1.15 |
| 2004/0216084 A1 * | 10/2004 | Brown | ............... | G06Q 10/0633 717/102 |
| 2006/0112380 A1 * | 5/2006 | Heller | ............... | G06F 17/30551 717/168 |
| 2006/0179058 A1 * | 8/2006 | Bram | ..................... | G06F 21/121 |
| 2006/0294258 A1 * | 12/2006 | Powers-Boyle | ....... | G06Q 30/02 709/246 |
| 2007/0078810 A1 * | 4/2007 | Hackworth | ....... | G06F 17/30899 |
| 2008/0095142 A1 * | 4/2008 | Sibigtroth | .......... | G07C 9/00182 370/349 |
| 2008/0147487 A1 * | 6/2008 | Hirshberg | ............... | G06Q 30/02 705/14.53 |
| 2008/0320225 A1 * | 12/2008 | Panzer | ............. | G06F 17/30902 711/130 |
| 2009/0079763 A1 * | 3/2009 | Takeichi | ................... | G06T 1/20 345/630 |
| 2010/0114720 A1 * | 5/2010 | Jones | ................. | G06Q 30/0251 705/14.73 |
| 2010/0306642 A1 * | 12/2010 | Lowet et al. | ................. | 715/234 |
| 2011/0086613 A1 * | 4/2011 | Doudkine | ............ | G06Q 10/107 455/410 |

* cited by examiner

*Primary Examiner* — Scott T Baderman
*Assistant Examiner* — Steve P Golden
(74) *Attorney, Agent, or Firm* — Lee & Hayes, P.C.

(57) ABSTRACT

Content rendered by content browsers may be rendered in an initial load followed by a number of dynamic updates. When testing the behavior of such content as it is rendered, a listener script is injected into the content after the initial load. The listener script maintains an update indicator that indicates information regarding dynamic updates. The indicator is monitored to detect a situation in which no dynamic updates have been performed within a predetermined period of time. Upon detecting such a situation, it may be concluded that the content has been substantially rendered.

18 Claims, 3 Drawing Sheets

DETERMINING LOAD COMPLETION OF DYNAMICALLY UPDATED CONTENT

BACKGROUND

Internet and other server-based content increasingly use asynchronous communications technologies such as AJAX (Asynchronous JavaScript and XML) to dynamically update displayed content without requiring entire page reloading. When using these technologies, a content page loaded by a web browser may continue to request new or updated data from a server after initially loading, and may update fields or other portions of the content in response to receiving the new or updated data.

When testing the behavior of content using such asynchronous technologies, it can be difficult to determine the point in time at which a page has been substantially loaded, because the page may continue to sporadically load content even after initially requested content has been received and rendered.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for testing and evaluating behaviors of server-based content and applications that utilize dynamic, asynchronous updates subsequent to initial page loads. After a rendering engine has completed the initial page load, a listener script is injected into the content to monitor dynamic updates to the content. The listener script is configured to receive notifications from the rendering engine that indicate modifications to the rendered content. The listener script is further configured to revise an update indicator upon every modification of the rendered content.

A test module or other test instrumentation is configured to periodically examine the update indicator to determine whether any changes to the content have occurred within a predetermined "cool-down" period. The length of the cool-down period may be configured depending on the nature of the content. If no dynamic updates occur for a length of time equal cool-down period, the test module concludes that initial loading of the content has been substantially completed.

Figure 1:
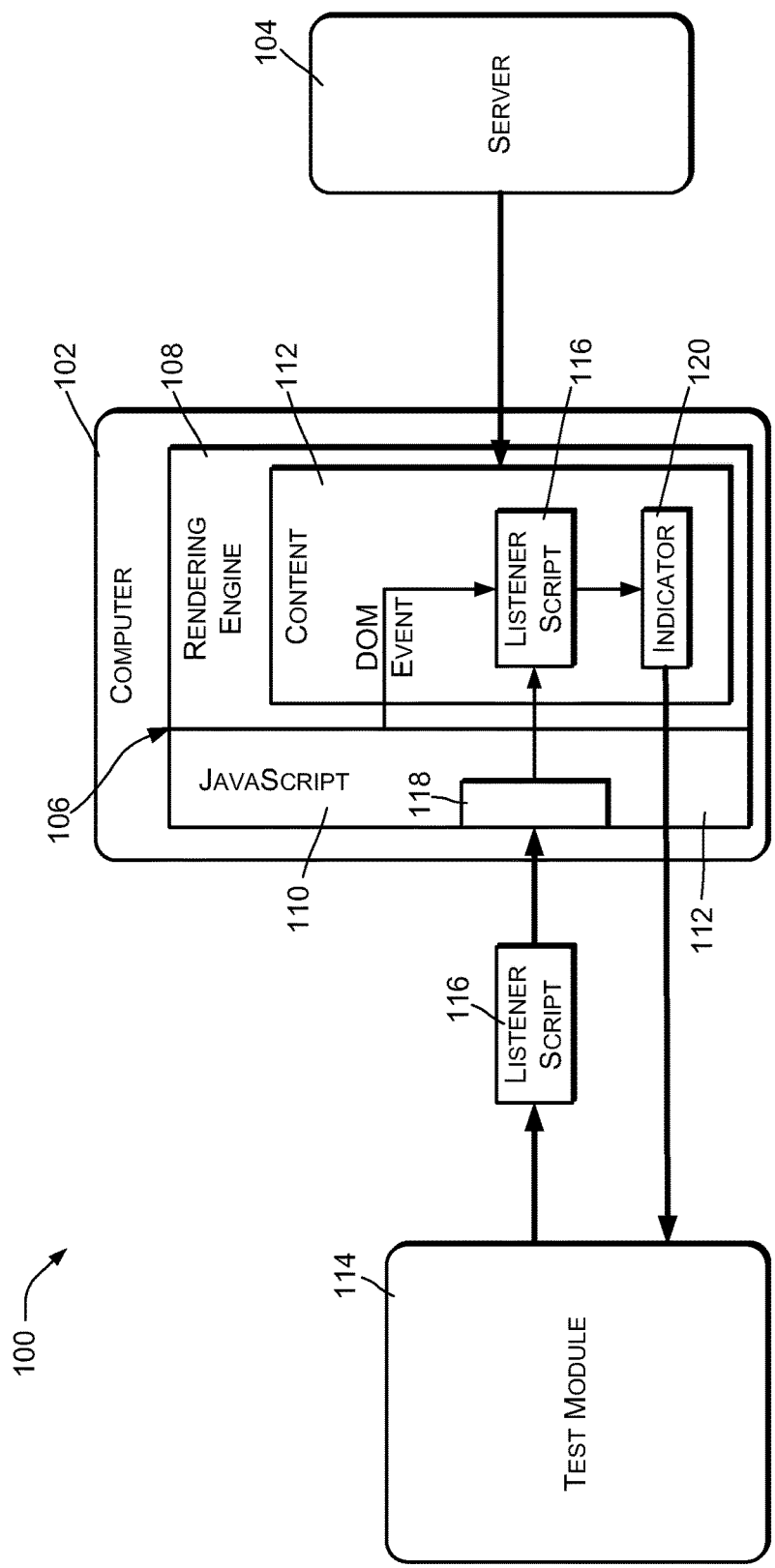
FIG. 1 is a block diagram illustrating an example test configuration for testing dynamically updated content.

FIG. 1 illustrates a system 100 for testing behavior of server-based content when it is displayed by a client. The client in this example comprises a computer 102, which may be any of various types of devices configured to receive and render content. The computer 102 may comprise a personal computer, a mobile device, a communications device, a medium consumption device, a media generation device, and so forth.

The computer 102 may have wired and/or wireless communications capabilities, so that it can connect to the Internet or other network sources. Such wireless capabilities may utilize wired or wireless networking, cellular technologies, or other technologies. In the described example, the computer 102 receives content from a server 104, which may be an Internet-based server or service, or which may comprise any other source of content. In some embodiments, the content may be received from sources that are local to the computer 102.

The computer 102 is configured to provide a browser 106, which may include a rendering engine or layout engine 108. The rendering engine 108 may implement or be associated with a scripting engine 110, which in the described embodiment comprises a JavaScript engine. More generally, the function of the browser 106 may be performed by any program or application that is capable of displaying a web container or displaying web content.

The browser 106 is designed and configured to receive and render content 112, which is received from a source such as the server 104. The content 112 may be specified in a markup or layout language such as HTML (hypertext markup language), HTML5, and/or XML (extensible markup language), and may also incorporate elements of other languages such as CSS (cascading style sheets) or CSS3 for specifying and categorizing the look and formatting of the content 112. In addition, the content 112 may include executable components, such as scripts written in JavaScript or other languages. Scripts and other programmatic or executable portions of the content may be executed by the scripting engine 110.

The content 112 may comprise AJAX content, which may use JavaScript and XML languages and techniques for dynamic updates. The content 112 may thus be rendered in an initial load, followed by one or more dynamic updates, which may be performed using asynchronous server communications.

Thus, the content 112 may include content that is initially obtained from the server 104, as well as content that is subsequently or dynamically obtained through asynchronous server requests. The content 112 may also include executable components that are injected by testing logic subsequent to initial content loading, as will be described in more detail below.

A test module 114 may be configured to interact with the browser 106 or rendering engine 108 during content rendering. The test module 114 may comprise a separate computer or test instrumentation, or may comprise a module or application that executes on the computer 102. In certain implementations, the test module 114 may comprise an interactive console associated with the scripting engine 110, such as a JavaScript console interface.

In situations where the computer 102 comprises a mobile device, the test module 114 may reside on a separate computer, and may access the mobile device using an instrumentation interface of the mobile device. Alternatively, the test module 114 may reside on the mobile device itself as a background process.

In order to test the behavior of the content 112, the test module 114 may be configured or instructed to provide a listener script 116 to the scripting engine 110 of the rendering engine 108 while the browser 106 is displaying the content 112. More specifically, the listener script 116 may be injected into the content 112, for execution in conjunction with the content 112, by calling a load method 118 that is exposed by the scripting engine 110. In the environment described herein, the load method 118 may comprise the executeJavaScript method, which is typically provided as a part of the JavaScript environment. In other environments, the listener script 116 may be injected by using an instrumentation console provided by an application such as an Internet browser, or by the use of other interfaces that may be provided in various environments. The listener script 116 may be loaded or injected into the content 112 dynamically, immediately after the JavaScript pageLoad event.

Upon execution in conjunction with the content 112, the listener script 116 is configured to register itself to receive notifications of certain events that occur with respect to the content 112. In particular, the listener script configures itself to receive notifications of any changes to the rendered content 112.

The structure of the rendered content may be defined through what is known as a Document Object Model (DOM). The DOM for the content 112 includes high-level container specifications that may be used to refer to most or all of the rendered content 112. For example, the DOM may specify body or content containers that refer to most or all of the content 112.

The JavaScript engine 110 provides an event notification service so that executable elements of the content 112, such as the injected listener script 116, may be notified in response to DOM-related events. In this example, the listener script 116 is configured to receive notifications or callbacks in response to events relating to a high-level DOM container such as the body or content container of the rendered content 112. In particular, the listener script registers to receive callbacks in response to the DOMSubTree-Modified event, with respect to the body or content container of the rendered content. As a result, the listener script receives notifications or callbacks upon any changes to the rendered content 112.

Upon receiving each DOM event notification or callback, the listener script 116 is configured to revise an update indicator 120. The update indicator may comprise a variable or value that is updated by the listener script 116 upon each dynamic update to the content 112. For example, the update indicator 120 may comprise a count value that is incremented upon each dynamic update to the content 112. Alternatively, or additionally, the update indicator may comprise a time stamp or time value, indicating the time at which the last dynamic update was performed.

The test module 114 is configured to periodically access the current value of the update indicator 120. The period at which the test module 114 performs these accesses may be configured based on testing objectives and on the nature of the content 112 that is being tested or evaluated. For example, the query interval may comprise 3 seconds in some situations.

Accessing the update indicator 120 may be performed by an appropriate method call to the scripting engine 110, or by accessing the update indicator through an instrumentation console or test interface.

Upon obtaining the update indicator 120, the test module 114 compares its value to a previously obtained indicator value to determine whether a dynamic content update has been performed within a predefined period of time, which may be referred to as a cool-down period. If no dynamic updates have been performed within such a cool-down period, the test module 114 may conclude that loading of the content has been substantially completed. Otherwise, if one or more dynamic updates have been performed within the most recent cool-down period, the test module 114 may conclude that the content is continuing to be loaded, and/or that the initial loading has not been completed. The length of the cool-down period may be configured depending on the characteristics of the content being evaluated and/or the objectives of the testing.

In certain embodiments, the most recently retrieved value of the update indicator 120 may be compared to the most previously retrieved value, to determine whether the update indicator has changed from one access of the update indicator to a subsequent access of the update indicator. If the update indicator is unchanged from a first examination of the update indicator 120 to a subsequent, second examination of the update indicator 120, the test module 114 may conclude that the content has been substantially loaded.

Figure 2:
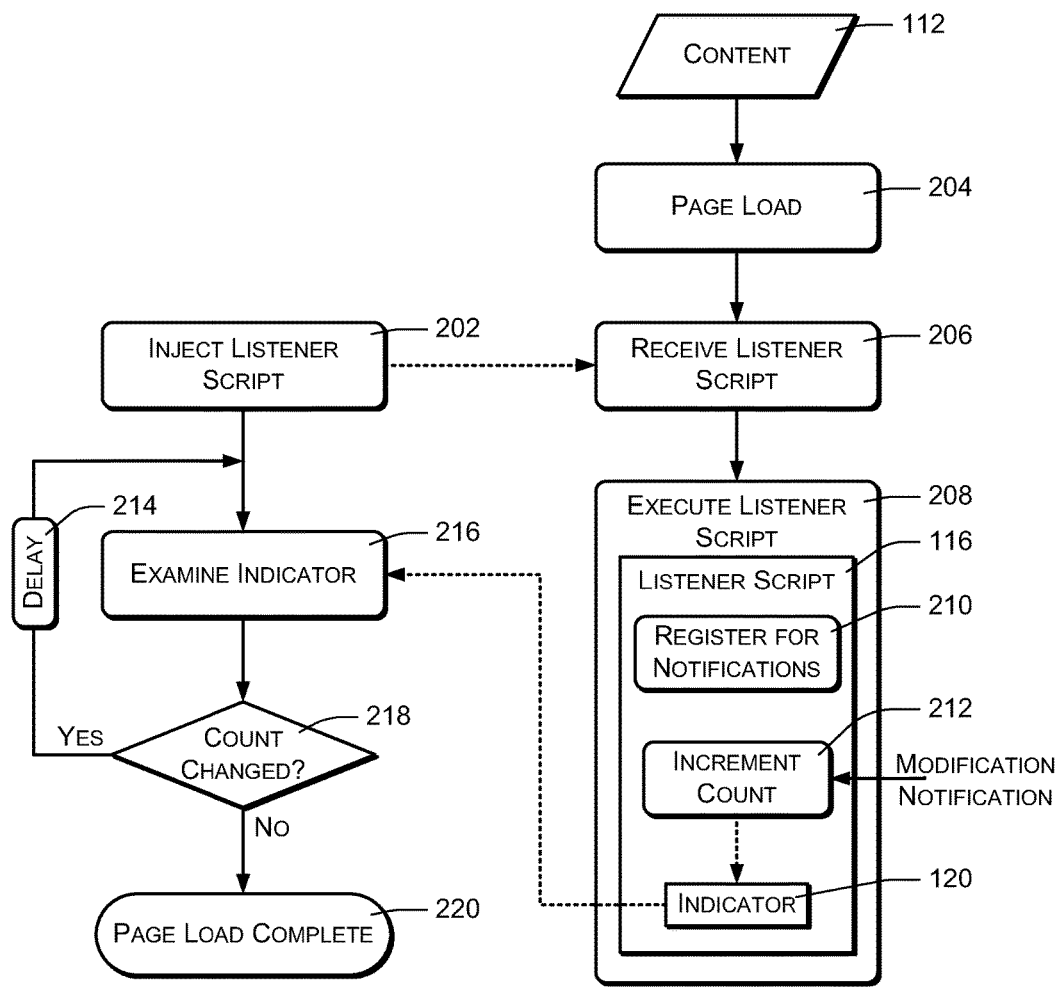
FIG. 2 is a flow diagram illustrating an example process for testing the behavior of dynamically updated content.

FIG. 2 illustrates an example method 200 that may be performed to evaluate behavior of active and dynamically updated content 112 such as described above. Actions along the left side of FIG. 2 are performed by the test module 114. Actions along the right side of FIG. 2 are performed by the rendering engine 108, and/or by components associated with the rendering engine such as the scripting engine 110. Although the method 200 is described with respect to the environment of FIG. 1, it may be performed in other environments.

An action 202, performed by the test module 114, may comprise submitting or injecting the listener script 116 for execution in conjunction with the content 112. The listener script 116 may be submitted by the test module 114 by calling or invoking a suitable method 118 exposed by an API of the scripting engine 110. For example, the test mode may call or invoke the executeJavaScript method of the scripting engine in order to submit the listener script.

Moving to the right side of FIG. 2, the rendering engine 108 initially receives the content 112 and performs a page load 204. The page load 204 comprises performing an initial loading of the content 112. The content 112 may include executable and updatable elements.

Prior to performing dynamic or asynchronous updates, the rendering engine 108 receives the listener script 116 in an action 206. For example, the rendering engine may be configured to automatically load the listener script 116 upon completion of the page load event that is typically generated by the rendering engine 108 upon completion of an initial page load.

An action 208, performed by the rendering engine 108 or the scripting engine 110 of the rendering engine, may comprise executing the listener script 116 in conjunction with the content 112.

The listener script 116 may be configured to initially register with the rendering engine 108 in an action 210, to receive callbacks or notifications upon modifications to the rendered content 112. As discussed above, this may comprise calling the DOMSubTreeModified that is exposed by the scripting engine 110, while referencing the body or content element of the content. In response to calling DOMSubTreeModified, the listener script 116 will be called or notified in response to any dynamic modification to the content 112.

The listener script 116 includes an increment count function 212 that is called or notified by the scripting engine 110 in response to each dynamic modification of the rendered content 112. In the example of FIG. 2, the update indicator 120 comprises a count value, and increment count function 212 updates or increments the count value in response to each dynamic update to the content 112.

Although the update indicator 120 comprises a counter or count value in this example, the update indicator may also, or alternatively, comprise a time-stamp, other value, or other information that may be used by the test module 114 to determine whether dynamic updates have occurred within a cool-down period.

Returning to the left side of FIG. 2, the test module 114 retrieves and/or examines the update indicator 120 at periodic intervals defined by a delay value 214. More specifically, an action 216 may comprise examining the update indicator 120 by querying the rendering engine 108 through the scripting engine 110. An action 218 may comprise determining whether the update indicator 120 has changed since the most previous iteration of the action 216. If the update indicator 120 has changed, a delay is imposed in accordance with the delay value 214, and the examination action 216 is repeated after this delay. Otherwise, if the update indicator 120 has not changed since the last iteration of the action 216, an action 220 comprises concluding that the content 112 has been substantially rendered.

Figure 3:
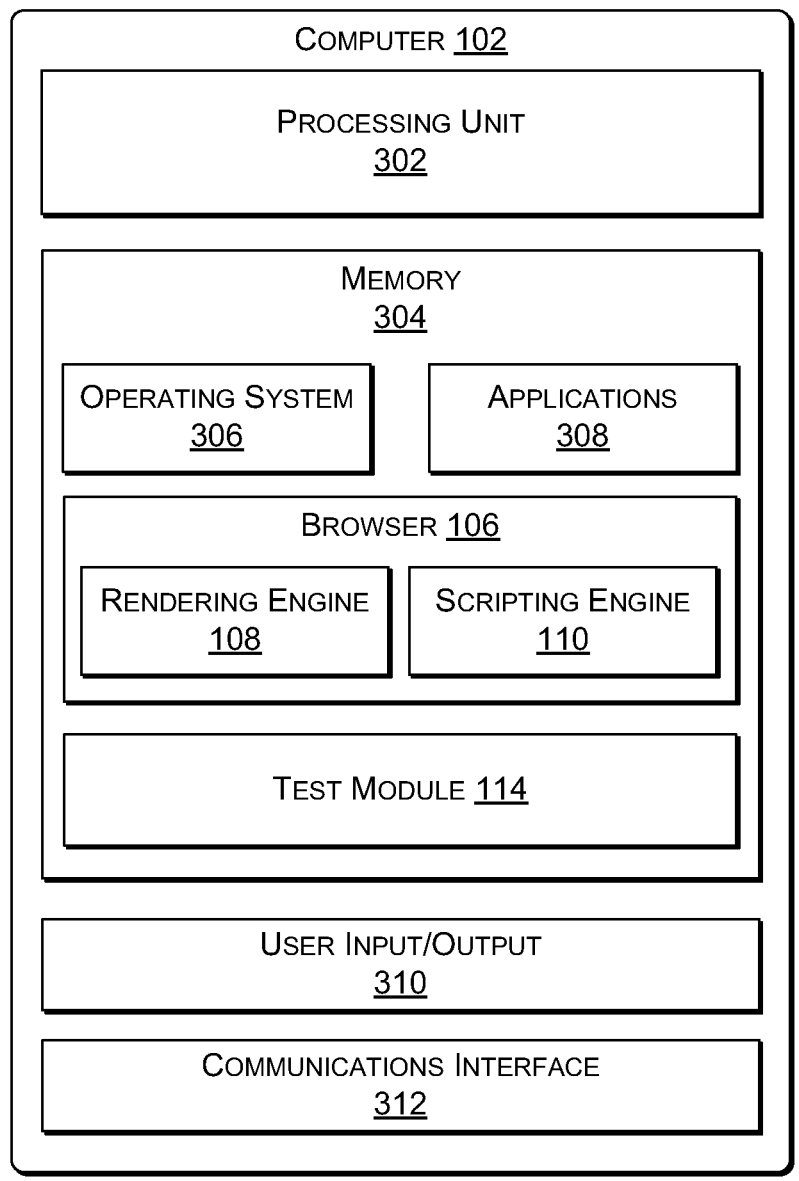
FIG. 3 is a block diagram showing relevant high-level components of an example computer that may be configured for use in conjunction with the techniques described herein.

FIG. 3 shows relevant components of the computer 102 in accordance with an example implementation. The computer 102 may comprise a general-purpose computer such as a desktop computer or other device with similar functionality and capabilities, including mobile devices, dedicated function devices, and so forth.

As an example of high-level computer components, the computer 102 may comprise one or more processing units 302 and one or more forms of computer-readable memory 304. The memory 304 may comprise volatile and nonvolatile memory. Thus, the memory 304 may include, but is not limited to, RAM, ROM, EEPROM, flash memory, or other memory technology, or any other medium which can be used to store applications and data. The memory 304 may also include removable media such as optical disks, portable devices/drives, and so forth.

The memory 304 may be used to store any number of functional components, such as programs and program modules that are executable on the processing unit 302. For example, the memory 304 may store an operating system 306 and various applications or user-specified programs 308. The operating system 306 and/or the user-specified programs 308 may include components, modules, and/or logic for performing the actions described herein. For example, executable components stored in the memory 304 may comprise computer-executable instructions that, when executed, cause the one or more processing units 302 to perform acts and to implement techniques described herein.

More specifically, the computer 102 may implement the browser 106 in the memory 304. The browser 106 may include the rendering engine 108 and the scripting engine 110, and may be configured to render web-based content or other content that is implemented in accordance with various layout and scripting languages as described above.

The computer 102 may also implement the test module 114, although the test module 114 may alternatively be implemented in separate test instrumentation that communications with the computer 102.

The computer 102 may also have user input/output components 310, such as a display, keyboard, mouse, etc. The computer 102 may also comprise a communications interface 312 such as a USB interface, for connection to external test instrumentation.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:

rendering content using a rendering engine executing on an electronic device, wherein the content is rendered in an initial load followed by one or more dynamic updates;

providing a listener script to the rendering engine for execution in conjunction with the content, wherein the listener script is configured to be injected into the content and increment a count value in response to at least a first dynamic update of the one or more dynamic updates;

determining completion of the first dynamic update;

based at least in part on the completion of the first dynamic update, causing the listener script to increment the count value to a first count value, the first count value indicating the first dynamic update;

accessing, at a first time, the count value from the rendering engine to determine the first count value;

determining that a predetermined period of time has elapsed since accessing the count value at the first time;

based at least in part on the predetermined period of time elapsing, accessing, at a second time, the count value from the rendering engine to determine a second count value;

comparing the first count value determined at the first time to the second count value determined at the second time;

determining, based at least in part on comparing the first count value to the second count value, that a second dynamic update has not been performed on the content for the predetermined period of time; and determining that the content has been substantially rendered.

2. The one or more non-transitory computer-readable media of claim 1, wherein:
the listener script is provided for execution after a page load event generated by the rendering engine in conjunction with the initial load of the content; and
the listener script is configured to be injected into the content after the initial load of the content.

3. The one or more non-transitory computer-readable media of claim 1, wherein accessing the count value comprises examining a variable maintained by the listener script.

4. The one or more non-transitory computer-readable media of claim 1, wherein the listener script is configured to register with the rendering engine to receive a notification in response to the at least the first dynamic update of the one or more dynamic updates.

5. The one or more non-transitory computer-readable media of claim 1, wherein the listener script is configured to receive notifications upon DOMSubTreeModified events generated by the rendering engine.

6. The one or more non-transitory computer-readable media of claim 1, wherein the one or more dynamic updates are performed using asynchronous server requests.

7. The one or more non-transitory computer-readable media of claim 1, the acts further comprising:
determining, based at least in part on comparing the first count value to the second count value, that the first count value includes a same value as the second count value,
wherein determining that the second dynamic update has not been performed on the content for the predetermined period of time is based at least in part on the first count value including the same value as the second count value.

8. The one or more non-transitory computer-readable media of claim 1, the acts further comprising:
accessing, prior to the first time, the count value from the rendering engine to determine an initial count value;
determining, based at least in part on the initial count value and the first count value, that the count value changed from accessing the count value prior to the first time to accessing the count value at the first time; and
determining, based at least in part on determining that the count value changed, that the content is still being rendered.

9. A method comprising:
rendering, by an electronic device, content using a rendering engine, wherein the content is rendered in an initial load followed by one or more dynamic updates;
submitting, by the electronic device, a script for execution by the rendering engine in conjunction with the content after the initial load of the content, wherein the script is responsive to the one or more dynamic updates to revise an update indicator;
determining, by the electronic device, completion of a first dynamic update of the one or more dynamic updates;
based at least in part on the completion of the first dynamic update, causing, by the electronic device, the script to revise the update indicator to a first value, the first value being associated with the first dynamic update;
determining, by the electronic device, and at a first time, the first value associated with the update indicator;
determining, by the electronic device, that a predetermined period of time has elapsed since determining the first value;
based at least in part on the predetermined period of time elapsing, determining, by the electronic device, and at a second time, a second value associated with the update indicator;
comparing, by the electronic device, the first value to the second value;
determining, by the electronic device, and based at least in part on comparing the first value to the second value, that a second dynamic update has not been performed for the predetermined period of time; and
determining, by the electronic device, and based at least in part on determining that the second dynamic update has not been performed for the predetermined period of time, that the content has been substantially rendered.

10. The method of claim 9, wherein the update indicator comprises a count value and the script is responsive to the one or more dynamic updates to increment the count value.

11. The method of claim 9, wherein determining that the second dynamic update has not been performed comprises determining, based at least in part on comparing the first value to the second value, that the update indicator is unchanged for the predetermined period of time.

12. The method of claim 9, wherein determining that the second dynamic update has not been performed comprises determining, based at least in part on comparing the first value to the second value, that the update indicator is unchanged from the first time to the second time.

13. The method of claim 9, wherein the one or more dynamic updates are performed using asynchronous server requests.

14. The method of claim 9, wherein determining the first value associated with the update indicator comprises retrieving a variable maintained by the script.

15. The method as recited in claim 9, further comprising:
accessing, by the electronic device, and at the first time, the update indicator to determine the first value; and
accessing, by the electronic device, and at a second time, the updated indicator to determine the second value,
wherein accessing the update indicator at the second time occurs subsequently to accessing the update indicator at the first time.

16. A method, comprising:
rendering, by an electronic device, content using a rendering engine;
submitting, by the electronic device, a script for execution by the rendering engine in conjunction with the content;
determining, by the electronic device, and at a first time, a first value using the script, the first value indicating a first dynamic update to the content;
determining, by the electronic device, completion of a second dynamic update;
based at least in part on the completion of the second dynamic update, causing, by the electronic device, the script to change the first value to a second value, the second value indicating the second dynamic update to the content;
determining, by the electronic device, that a predetermined period of time has elapsed since determining the first value;
based at least in part on the predetermined period of time elapsing, determining, by the electronic device, and at a second time, the second value using the script;
comparing, by the electronic device, the first value to the second value; and
determining, by the electronic device, and based at least in part on comparing the first value to the second value, that the second dynamic update occurred during the predetermined period of time; and determining that the content is still being rendered.

17. The method of claim 16, wherein:

determining the first value comprises examining, at the first time, an update indicator associated with the script to determine the first value, the update indicator indicating information regarding at least the first dynamic update that has been performed with respect to the content; and determining the second value comprises examining, at the second time, the update indicator to determine the second value.

18. The method of claim 16, wherein the script is configured to revise an update indicator in response to at least the first dynamic update of the content.

* * * * *